United States Patent
Terashima

(10) Patent No.: US 10,274,165 B2
(45) Date of Patent: Apr. 30, 2019

(54) BACKLIGHT MODULE

(71) Applicants: SINTAI OPTICAL (SHENZHEN) CO., LTD., Guang Ming New Zone, ShenZhen, Guandong Province (CN); ASIA OPTICAL CO., INC., Taichung (TW)

(72) Inventor: Toshihiko Terashima, Taichung (TW)

(73) Assignees: SINTAI OPTICAL (SHENZHEN) CO., LTD., Shenzhen, Guangdong Province (CN); ASIA OPTICAL CO., INC., Taichung (TW)

(*) Notice: Subject to any disclaimer, the term of this patent is extended or adjusted under 35 U.S.C. 154(b) by 71 days.

(21) Appl. No.: 15/590,279

(22) Filed: May 9, 2017

(65) Prior Publication Data

US 2018/0045396 A1 Feb. 15, 2018

(30) Foreign Application Priority Data

Aug. 11, 2016 (CN) .......................... 2016 1 0663001

(51) Int. Cl.
*F21V 11/14* (2006.01)
*F21V 7/04* (2006.01)
*G02F 1/1335* (2006.01)
*F21Y 105/16* (2016.01)

(52) U.S. Cl.
CPC ................ *F21V 11/14* (2013.01); *F21V 7/04* (2013.01); *G02F 1/133602* (2013.01); *G02F 1/133606* (2013.01); *G02F 1/133611* (2013.01); *F21Y 2105/16* (2016.08); *G02F 1/133605* (2013.01)

(58) Field of Classification Search
CPC .................................................. F21Y 2105/16
See application file for complete search history.

(56) References Cited

U.S. PATENT DOCUMENTS

2017/0363910 A1* 12/2017 Fukuda ............. G02F 1/133605

* cited by examiner

*Primary Examiner* — Nimeshkumar D Patel
*Assistant Examiner* — Jacob R Stern
(74) *Attorney, Agent, or Firm* — McClure, Qualey & Rodack, LLP

(57) ABSTRACT

A backlight module includes a housing, a lighting curtain, a light source, and a diffusion plate. The housing includes a base plate and a side wall inclined relative to the base. The lighting curtain is disposed in the housing, and includes a central portion separated from the base plate, and an edge portion inclined relative to the central portion. The edge portion is connected to the side wall. The light source is disposed on the base plate, and located under the central portion. The diffusion plate is located on the lighting curtain, and separated from the central portion. The edge of the diffusion plate is connected to the side wall.

19 Claims, 5 Drawing Sheets

BACKLIGHT MODULE

CROSS-REFERENCE TO RELATED APPLICATIONS

This application claims priority of China Patent Application No. 201610663001.3 filed on Aug. 11, 2016, the entirety of which is incorporated by reference herein.

BACKGROUND OF THE INVENTION

Field of the Invention

The present disclosure relates to a backlight module, and in particular to a backlight module applied to the display device.

Description of the Related Art

A backlight module is used to provide light for display devices. However, recently, display devices have gradually become thinner. To achieve a thin profile in a display device, an inclined surface is formed on the edge of the casing of the display device. However, in a direct-type backlight module, when the edge of the casing includes an inclined surface, the illumination of the edge of the display panel is darker, and the illumination of the display panel is not uniform. As a result, the edge of the display panel cannot be used as part of the display, and thus the overall size of the display screen is decreased.

Although backlight modules have been generally adequate for their intended purposes, they have not been entirely satisfactory in all respects. Consequently, it would be desirable to provide a solution for improving the backlight modules.

BRIEF SUMMARY OF THE INVENTION

The present disclosure provides a backlight module to increase the illumination of the edge of the diffusion plate to make the illumination of the diffusion plate uniform.

The present disclosure provides a backlight module including a housing, a lighting curtain, a light source, and a diffusion plate. The housing includes a base plate and a side wall inclined relative to the base plate. The lighting curtain is disposed in the housing, and includes a central portion separated from the base plate and an edge portion inclined relative to the central portion. An angle between the central portion and the edge portion is greater than 90 degrees. The edge portion is connected to the side wall. The light source is disposed on the base plate, and located under the central portion. The diffusion plate is located on the lighting curtain, and separated from the central portion. The edge of the diffusion plate is connected to the side wall.

In one embodiment, the backlight module further includes a central spacing element connected to the base plate and the central portion; and an edge spacing element connected to the base plate and an interface between the central portion and the edge portion.

In one embodiment, the shortest distance between the light source and the side wall is greater than the shortest distance between the edge spacing element and the side wall.

In one embodiment, there is a first longest distance between the side wall and the edge portion, and there is a first shortest distance between the side wall and the edge portion. The first shortest distance is shorter than the first longest distance, and the angle is in a range from 100 degrees to 170 degrees.

In one embodiment, there is a second longest distance between the diffusion plate and the edge portion, and there is a second shortest distance between the diffusion plate and the edge portion. The second shortest distance is shorter than the second longest distance.

In one embodiment, the base plate is substantially parallel to the central portion, and the diffusion plate is substantially parallel to the central portion.

In one embodiment, a lower air layer is formed between the housing and the lighting curtain, and an upper air layer is formed between the lighting curtain and the diffusion plate. The lighting curtain includes through holes connected to the upper air layer and the lower air layer.

In one embodiment, the housing further includes a reflective layer disposed on the base plate and the side wall. The light source generates a light beam reflected by the reflective layer on the side wall, and passes through the edge portion and the diffusion plate.

The present disclosure provides a backlight module including a housing, a lighting curtain, central spacing elements, edge spacing elements, light sources, and a diffusion plate. The housing includes a base plate and a side wall inclined relative to the base plate. The lighting curtain is located in the housing, and includes a central portion separated from the base plate and an edge portion inclined relative to the central portion. An angle between the central portion and the edge portion is greater than 90 degrees, and the edge portion is connected to the side wall.

The central spacing elements are individually connected to the base plate and the central portion. The edge spacing elements are individually connected to the base plate and the interface between the central portion and the edge portion. The light sources are disposed on the base plate, and located under the central portion. The diffusion plate is located on the lighting curtain, and separated from the central portion. The edge of the diffusion plate is connected to the side wall.

In conclusion, the backlight module of the present disclosure utilizes the inclined edge portion to make the light beam emitted to the inclined side wall of the housing reflect to the lighting curtain. Therefore, the light beam is emitted from the edge of the diffusion plate, and the illumination of the diffusion plate edge is increased and uniform.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1B:
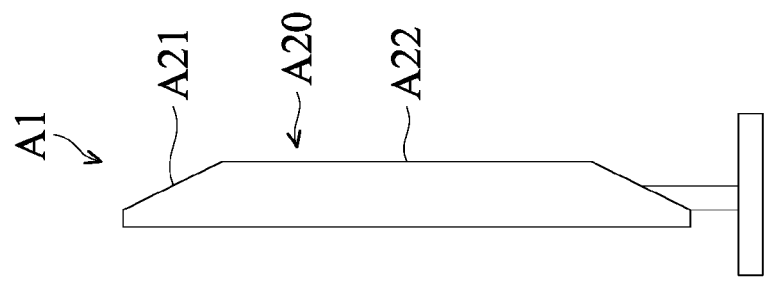
FIG. 1B is a side view of the display device in accordance with some embodiments of the disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to another element(s) or feature(s) as illustrated in the figures. The spatially relative terms are intended to encompass different orientations of the device in use or operation in addition to the orientation depicted in the figures. The shape, size, and thickness in the drawings may not be drawn to scale or simplified for clarity of discussion; rather, these drawings are merely intended for illustration.

Figure 1A:
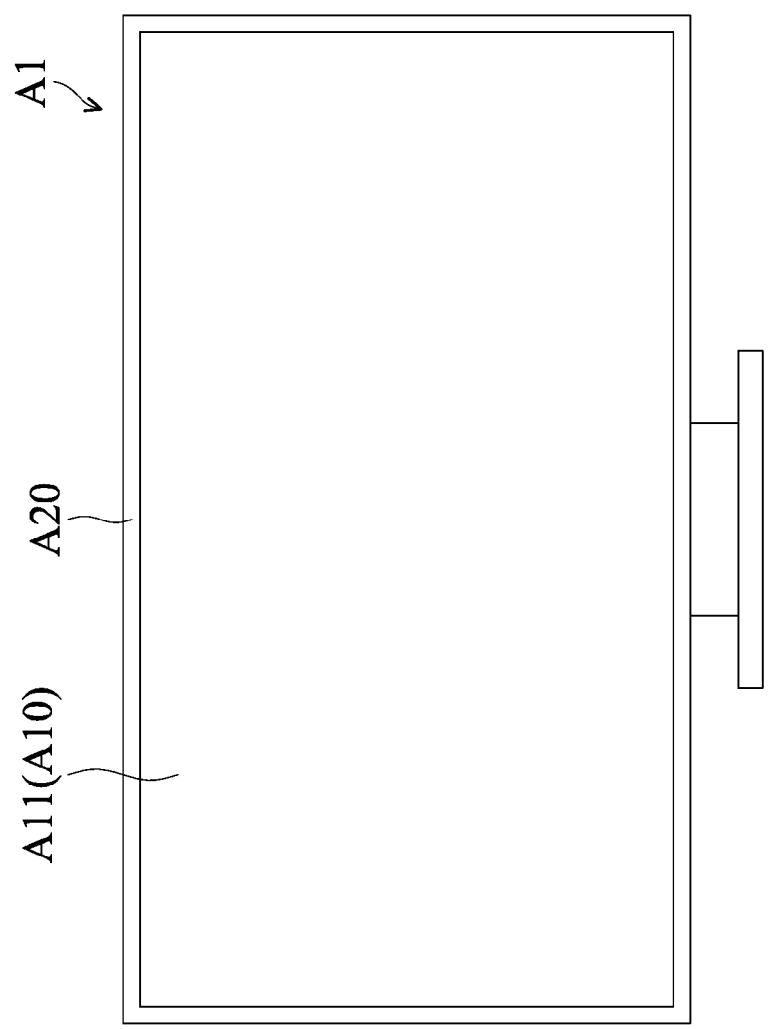
FIG. 1A is a front view of a display device in accordance with some embodiments of the disclosure.

FIG. 1 is a front view of a display device A1 in accordance with some embodiments of the disclosure. FIG. 1B is a side view of the display device A1 in accordance with some embodiments of the disclosure. The display device A1 includes a display module A10 and a casing A20. The display module A10 is disposed in the casing A20. The display module A10 includes a display panel A11 exposed from the casing A20. The casing A20 includes a side plate A21 and a rear plate A22. The side plate A21 is inclined relative to the rear plate A22 and the display panel A11. In this embodiment, there is an acute angle between the side plate A21 and the display panel A11, and there is an angle between the side plate A21 and the rear plate A22.

Figure 2:
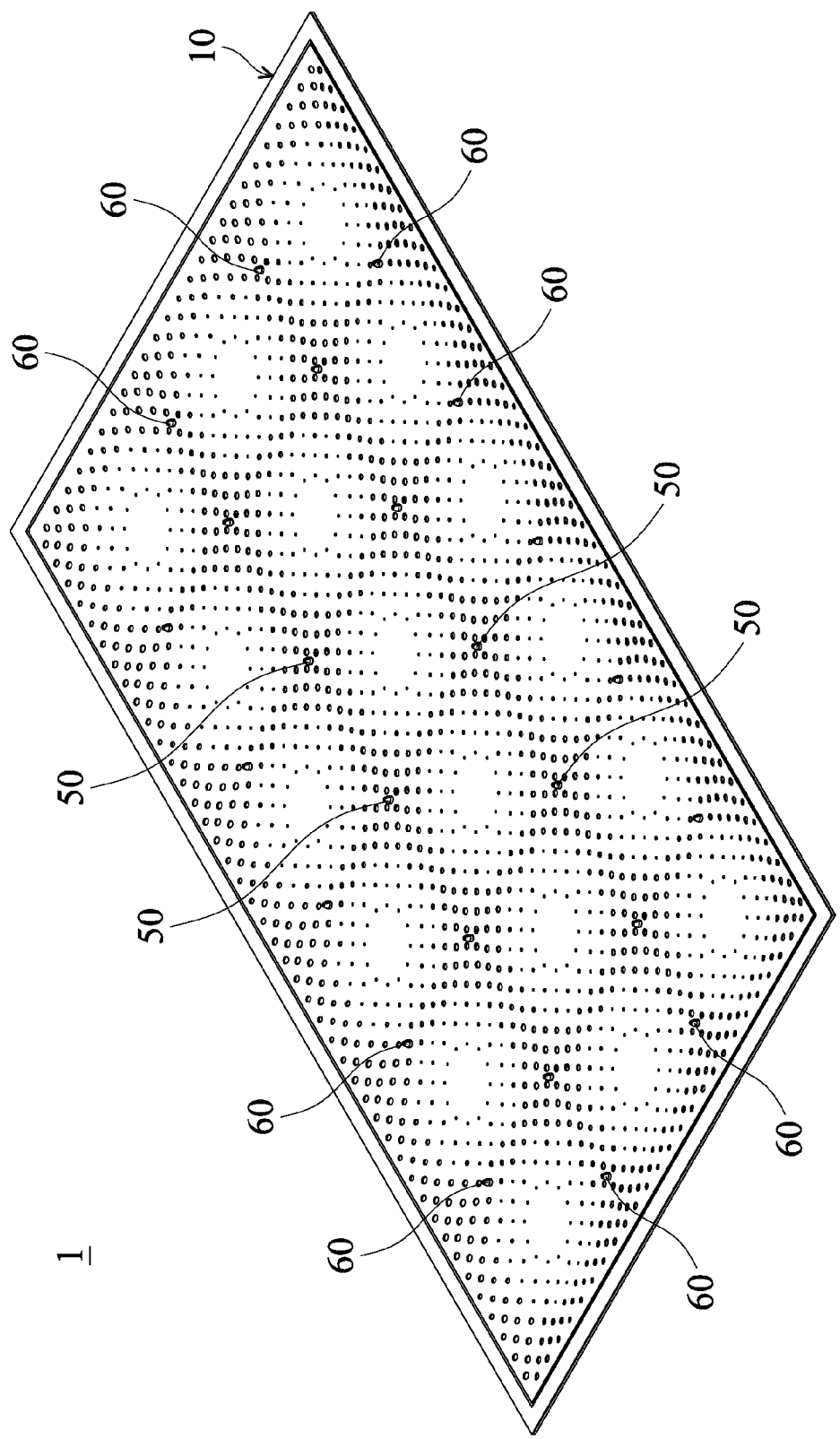
FIG. 2 is a perspective view of a backlight module in accordance with some embodiments of the disclosure.
Figure 3:
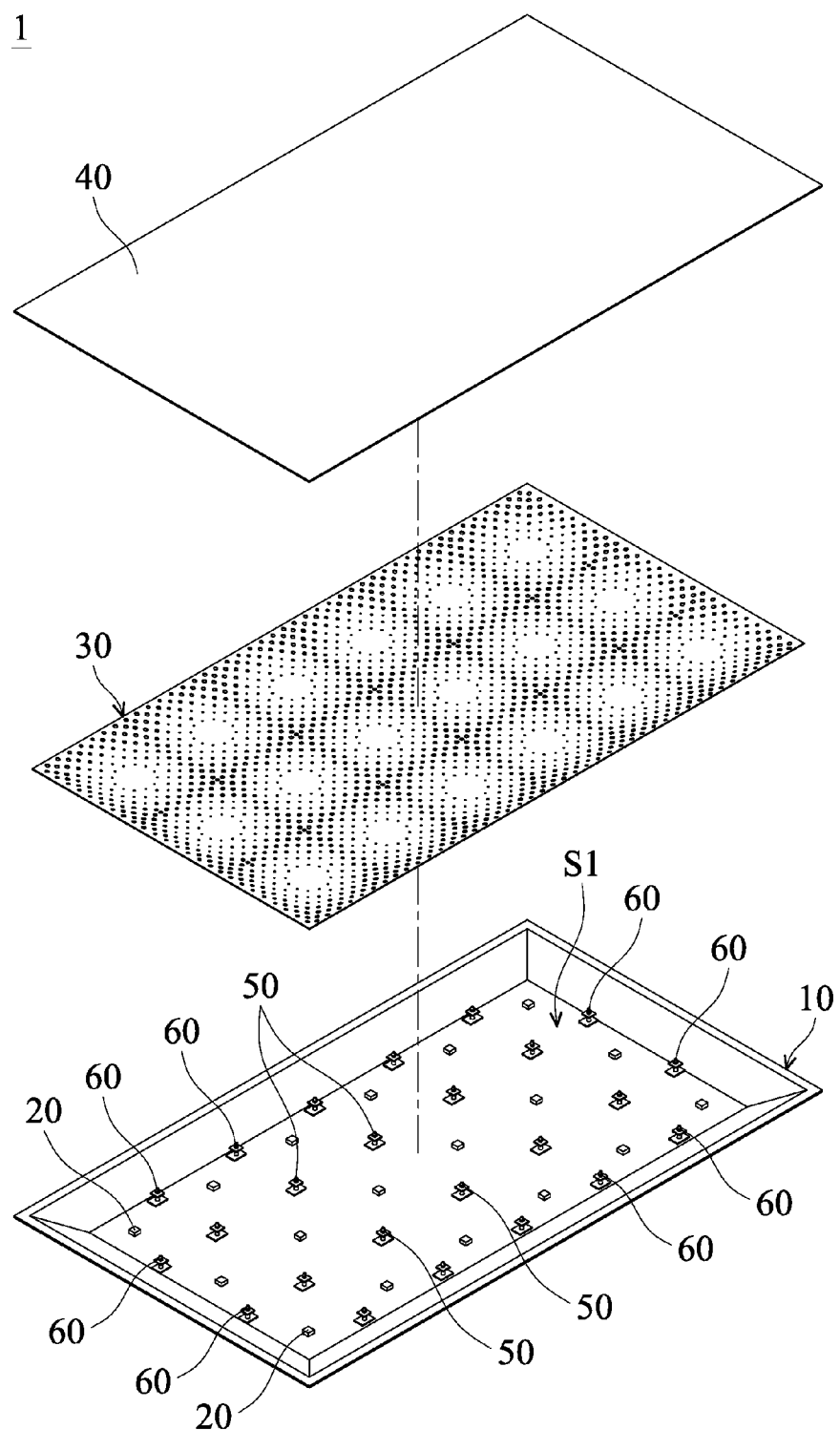
FIG. 3 is an exploded view of the backlight module in accordance with some embodiments of the disclosure.
Figure 4:
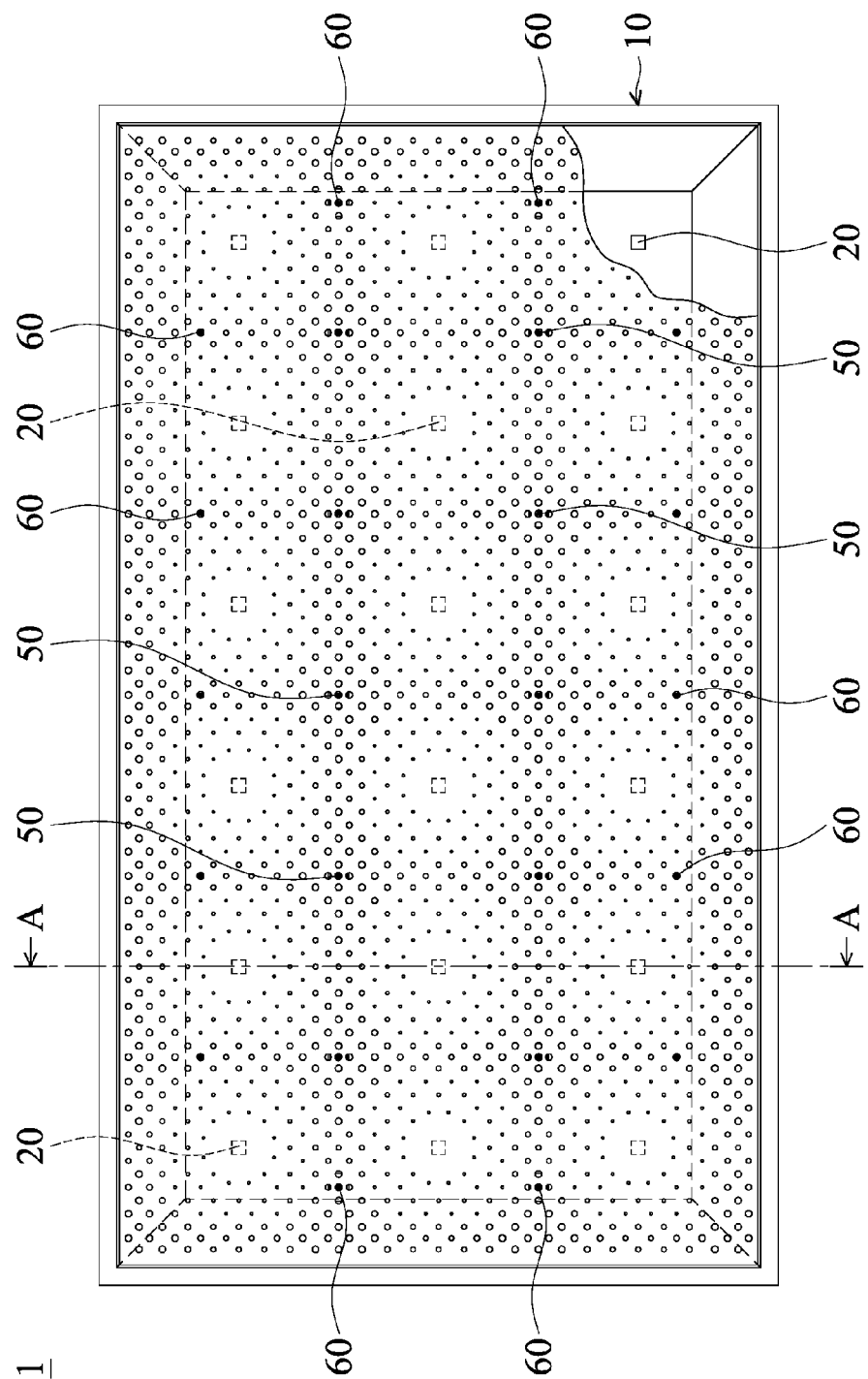
FIG. 4 is a top view of the backlight module in accordance with some embodiments of the disclosure.
Figure 5:
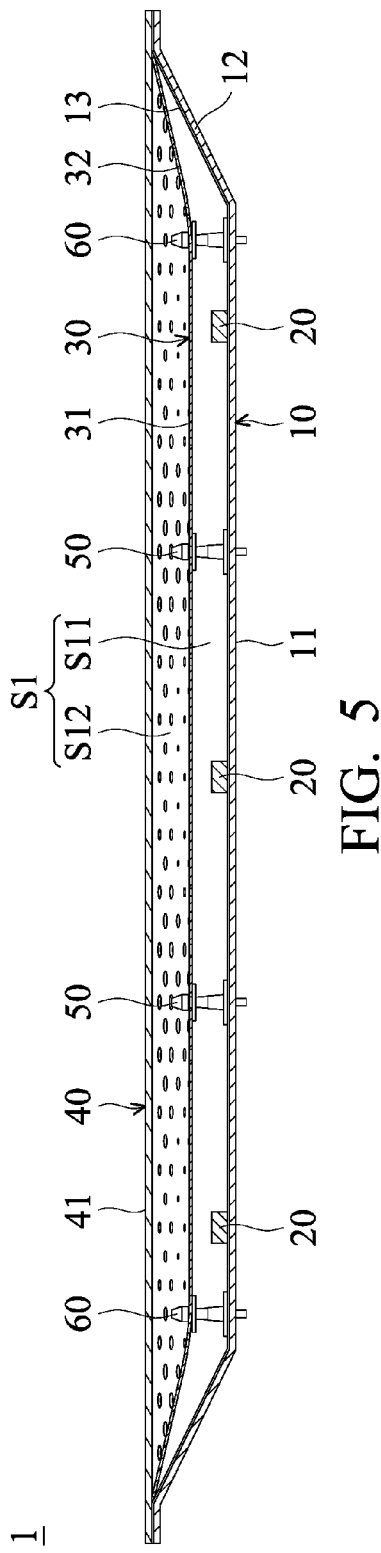
FIG. 5 is a cross-sectional view along the line AA of FIG. 4.
Figure 6:
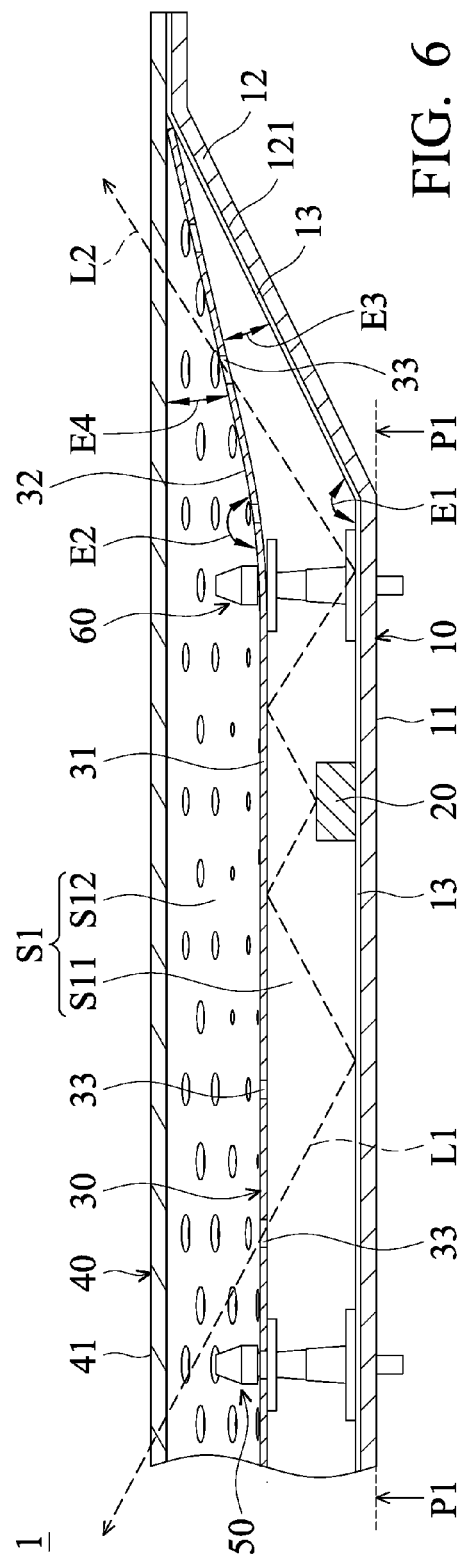
FIG. 6 is an enlarged view of FIG. 5.

FIG. 2 is a perspective view of a backlight module 1 in accordance with some embodiments of the disclosure, and the diffusion plate 40 is not shown in FIG. 2. FIG. 3 is an exploded view of the backlight module 1 in accordance with some embodiments of the disclosure. FIG. 4 is a top view of the backlight module 1 in accordance with some embodiments of the disclosure. FIG. 5 is a cross-sectional view along the line AA of FIG. 4. FIG. 6 is an enlarged view of FIG. 5. The display module A10 further includes a backlight module 1 disposed on the display panel A11, and located between the display panel A11 and the rear plate A22. The backlight module 1 is configured to provide light beams to the display panel A11.

The backlight module 1 includes a housing 10, light sources 20, a lighting curtain 30, and a diffusion plate 40. The housing 10 may be a thin shell structure, and can be made of metal, rigid plastic, or another suitable material.

The housing 10 includes a base plate 11, a side wall 12, and a reflective layer 13. The base plate 11 may be a thin plate structure, and extends along a reference plane P1 (as shown in FIG. 6). The side wall 12 is connected to the edge of the base plate 11, and inclined relative to the base plate 11. The side wall 12 can be a ring-like structure, surrounding the base plate 11. Therefore, a receiving space S1 can be formed by the base plate 11 and the side wall 12.

In this embodiment, the side wall 12 is a thin sheet structure. There is an angle E1 between the side wall 12 and the base plate 11. The angle E1 is in a range from about 100 degrees to 170 degrees. The side wall 12 has an inclined surface 121 (as shown in FIG. 6). The inclined surface 121 can be a plane or a curved surface.

The reflective layer 13 is disposed on the base plate 11 and the side wall 12, and located in the receiving space S1. The reflective layer 13 can be a thin film, attached to the base plate 11 and the side wall 12. In other words, the reflective layer 13 extends along the base plate 11 and the side wall 12.

The light sources 20 are arranged on the base plate 11 in an array, and located in the receiving space S1. In this embodiment, the light sources 20 are light emitting diodes, configured to emit light beams.

The lighting curtain 30 is disposed in the housing 10, and located in the receiving space S1. The lighting curtain 30 is configured to reflect the light beams generated by the light sources 20. A lower air layer S11 is formed between the housing 10 and the lighting curtain 30. The lighting curtain 30 includes a central portion 31 and an edge portion 32. The light beams can be transmitted in the lower air layer S11, since the light beams generated by the light sources 20 can be reflected or totally reflected by the lighting curtain 30 and the reflective layer 13 of the housing 10 in the lower air layer S11. In other words, the light beams can be transmitted from the light sources 20 under the central portion 31 to the lower air layer S11 between the side wall 12 and the edge portion 32.

The lighting curtain 30 may be a thin sheet structure. The central portion 31 and the edge portion 32 can be made of the same material, and the central portion 31 and the edge portion 32 can be formed as a single piece, or formed individually.

In this embodiment, the central portion 31 may be a thin plate structure. The central portion 31 is parallel or substantially parallel to the base plate 11, and separated from the base plate 11. Moreover, the light source 20 is disposed under the central portion 31.

The edge portion 32 is inclined relative to the central portion 31, and the edge portion 32 is connected to the side wall 12. In this embodiment, the edge portion 32 comes into contact with the interface between the side wall 12 and the diffusion plate 40. The edge of the edge portion 32 is clamped between the side wall 12 and the diffusion plate 40. Therefore, when the display device A1 is vibrated for some reason, such as the operation of a speaker, and the edge portion 32 resonates due to the vibration of the speaker, the edge portion 32 may not impact the side wall 12 or the diffusion plate 40, and may not generate noise.

The edge portion 32 may be a ring structure, surrounding the central portion 31. The edge portion 32 extends along a plane or a curved surface.

In this embodiment, there is an angle E2 between the edge portion 32 and the central portion 31. The angle E2 is greater than 90 degrees or in a range from about 100 degrees to 170 degrees. Moreover, there is an acute angle E3 between the edge portion 32 and the side wall 12. The acute angle E3 is in a range from about 20 degrees to 60 degrees. In other words, the distance between the side wall 12 and the edge portion 32 gradually narrows toward the location where the side wall 12 is connected to the edge portion 32.

The first longest distance is between the side wall 12 and the edge portion 32, and the first shortest distance is between the side wall 12 and the edge portion 32. The first shortest distance is shorter than one-third the first longest distance. The second longest distance is between the diffusion plate 40 and the edge portion 32, and the second shortest distance is between the diffusion plate 40 and the edge portion 32. The second shortest distance is shorter than one-third the second longest distance.

There is an acute angle E4 between the edge portion 32 and the diffusion plate 40. The acute angle E4 is in a range from about 20 degrees to 60 degrees. In other words, the distance between the diffusion plate 40 and the edge portion 32 narrows gradually toward the location of the connection between the diffusion plate 40 and the side wall 12.

In this embodiment, the lighting curtain 30 is made of opaque material. The lighting curtain 30 includes through holes 33 distributed on the central portion 31 and the edge portion 32. Therefore, the light beams generated by the light sources 20 can pass through the lighting curtain 30 via the through holes 33.

The diffusion plate 40 is located on the lighting curtain 30, and separated from the central portion 31. The diffusion plate 40 is configured to diffuse the light beam. The diffusion plate 40 may be a thin plate structure, and the diffusion plate 40 extends on a plane parallel to the reference plane P1. In other words, the diffusion plate 40 is parallel or substantially parallel to the central portion 31, and the diffusion plate 40 is parallel or substantially parallel to the base plate 11.

The edge of the diffusion plate 40 is connected to the side wall 12. In this embodiment, the edge of the diffusion plate 40 is affixed to the top of the side wall 12. An upper air layer S12 is formed between the lighting curtain 30 and the diffusion plate 40. The through holes 33 of the lighting curtain 30 are connected to the upper air layer S12 and the lower air layer S11. As shown in FIG. 5, the light beam L1 generated by the light source 20 is transmitted in the lower air layer S11. The light beam L1 passing through the through holes 33 enters into upper air layer S12. Afterwards, the light beam L1 passes through the diffusion plate 40, and is emitted from the luminous surface 41. The luminous surface 41 faces the display panel A11 of the display module A10.

In this embodiment, the lighting curtain 30 is flexible. The central spacing elements 50 and the edge spacing elements 60 are disposed on the base plate 11 to maintain the distance between the lighting curtain 30 and the housing 10. The central spacing elements 50 are connected to the base plate 11 and the central portion 31. In this embodiment, the bottoms of the central spacing elements 50 are affixed to the base plate 11, and the tops of the central spacing elements 50 are affixed to the central portion 31.

As shown in FIG. 5, the bottom of the central spacing element 50 passes through the base plate 11 and the reflective layer 13, and fastens onto two opposite surfaces of the base plate 11 and the reflective layer 13. Moreover, the top of the central spacing element 50 passes through the lighting curtain 30, and fastens onto two opposite sides of the lighting curtain 30.

The structure of the edge spacing element 60 is the same as the central spacing element 50. The edge spacing element 60 is connected to the base plate 11 and the interface between the central portion 31 and the edge portion 32. In the embodiment, the bottom of the edge spacing element 60 is affixed to the base plate 11, and the top of the edge spacing element 60 is affixed to the interface between the central portion 31 and the edge portion 32. The edge spacing element 60 is connected to the base plate 11 and the interface between the central portion 31 and the edge portion 32. Therefore, when the display device A1 is vibrated for some reason, such as the operation of a speaker, and the edge portion 32 resonates due to the vibration of the speaker, the edge portion 32 may not impact the side wall 12 or the diffusion plate 40, and may not generate noise.

As shown in FIG. 4, the central spacing elements 50 are arranged in an array. The edge spacing elements 60 are arranged around the central spacing elements 50. In other words, the edge spacing elements 60 are closer to the side wall 12 than the central spacing elements 50. As shown in FIG. 5, the shortest distance between the light source 20 and the side wall 12 is greater than the shortest distance between the edge spacing element 60 and the side wall 12. The shortest distance between the central spacing element 50 and the side wall 12 is greater than the shortest distance between the light source 20 and the side wall 12.

As shown in FIG. 3, in this embodiment, when the lighting curtain 30 is not disposed in the backlight module 1, the central portion 31 and the edge portion 32 of the lighting curtain 30 extend along a plane. Afterwards, the lighting curtain 30 is disposed in housing 10, and the lighting curtain 30 is affixed to the central spacing element 50 and the edge spacing element 60. Since the edge portion 32 abuts against to the top of the side wall 12, the edge portion 32 is bent relative to the central portion 31 by the edge spacing element 60. Therefore, the edge portion 32 can easily be bent so that it is inclined relative to the central portion 31. Moreover, since the lighting curtain 30 is bent by the edge spacing element 60 and the side wall 12, the lighting curtain 30 presents a curved shape.

According to the structure of the backlight module 1, as shown in FIG. 6, the light beam L2 generated by the light source 20 can be transmitted in the lower air layer S11. The light beam L2 entering into the side wall 12 and the edge portion 32 can be reflected by the reflective layer 13 on the side wall 12, and passes through the through hole 33 of the edge portion 32. Afterwards, the light beam L2 is emitted from the diffusion plate 40 over the edge portion 32. Therefore, the illumination of the edge of the diffusion plate 40 is increased, and the illumination of the diffusion plate 40 is uniform. Furthermore, the size of the image shown by the display panel A11 is increased.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a housing comprising a base plate and a side wall inclined relative to the base plate;
   a lighting curtain, disposed in the housing, comprising a central portion separated from the base plate and an edge portion inclined relative the central portion, wherein an angle between the central portion and the edge portion is greater than 90 degrees, and the edge portion is connected to the side wall;
   a light source, disposed on the base plate, located under the central portion;
   a diffusion plate, located over the lighting curtain, separated from the central portion, wherein an edge of the diffusion plate is connected to the side wall; and
   a lower air layer formed between the housing and the lighting curtain, wherein a light beam generated by the light source is transmitted in the lower air layer.

2. The backlight module as claimed in claim 1, further comprising:
   a central spacing element, connected to the base plate and the central portion; and
   an edge spacing element, connected to the base plate and an interface between the central portion and the edge portion.

3. The backlight module as claimed in claim 2, wherein a shortest distance between the light source and the side wall is greater than a shortest distance between the edge spacing element and the side wall.

4. The backlight module as claimed in claim 1, wherein there is a first longest distance between the side wall and the edge portion, there is a first shortest distance between the side wall and the edge portion, the first shortest distance is shorter than the first longest distance, and the angle is in a range from 100 degrees to 170 degrees.

5. The backlight module as claimed in claim 4, wherein there is a second longest distance between the diffusion plate and the edge portion, there is a second shortest distance between the diffusion plate and the edge portion, and the second shortest distance is shorter than the second longest distance.

6. The backlight module as claimed in claim 1, wherein the base plate is substantially parallel to the central portion, and the diffusion plate is substantially parallel to the central portion.

7. The backlight module as claimed in claim 1, wherein an upper air layer is formed between the lighting curtain and the diffusion plate, wherein the lighting curtain comprises a plurality of through holes connected to the upper air layer and the lower air layer.

8. The backlight module as claimed in claim 1, wherein the housing further comprises a reflective layer disposed on the base plate and the side wall, wherein the light source generates the light beam reflected by the reflective layer on the side wall, and passes through the edge portion and the diffusion plate.

9. A backlight module, comprising:
a housing, comprising a base plate and a side wall inclined relative to the base plate;
a lighting curtain, located in the housing, comprising a central portion separated from the base plate and an edge portion inclined relative to the central portion, wherein an angle between the central portion and the edge portion is greater than 90 degrees, and the edge portion is connected to the side wall;
a plurality of central spacing elements individually connected to the base plate and the central portion;
a plurality of edge spacing elements individually connected to the base plate and an interface between the central portion and the edge portion;
a plurality of light sources, disposed on the base plate, located under the central portion;
a diffusion plate, located over the lighting curtain, separated from the central portion, wherein an edge of the diffusion plate is connected to the side wall; and
a lower air layer formed between the housing and the lighting curtain, wherein a light beam generated by the light sources is transmitted in the lower air layer.

10. The backlight module as claimed in claim 9, wherein a shortest distance between the light sources and the side wall is greater than a shortest distance of the edge spacing elements and the side wall.

11. The backlight module as claimed in claim 9, wherein there is a first longest distance between the side wall and the edge portion, there is a first shortest distance between the side wall and the edge portion, the first shortest distance is shorter than the first longest distance, and the angle is in a range from 100 degrees to 170 degrees.

12. The backlight module as claimed in claim 11, wherein there is a second longest distance between the diffusion plate and the edge portion, there is a second shortest distance between the diffusion plate and the edge portion, and the second shortest distance is shorter than the second longest distance.

13. The backlight module as claimed in claim 9, wherein the base plate is substantially parallel to the central portion, and the diffusion plate is substantially parallel to the central portion.

14. The backlight module as claimed in claim 9, wherein an upper air layer is formed between the lighting curtain and the diffusion plate, wherein the lighting curtain comprises a plurality of through holes connected to the upper air layer and the lower air layer.

15. The backlight module as claimed in claim 9, wherein the housing further comprises a reflective layer disposed on the base plate and the side wall, wherein the light source generates the light beam reflected by the reflective layer on the side wall, and passes through the edge portion and the diffusion plate.

16. The backlight module as claimed in claim 9, wherein the light sources are arranged on the base plate in an array.

17. The backlight module as claimed in claim 9, wherein the base plate is a thin plate structure, and the side wall is a ring-like structure surrounding the base plate.

18. The backlight module as claimed in claim 9, wherein the central spacing elements are arranged in an array.

19. The backlight module as claimed in claim 9, wherein the edge spacing elements are arranged around the central spacing elements.

* * * * *